Aug. 1, 1950   W. H. DU BOIS   2,516,966
FRICTION ELEMENT
Filed Sept. 7, 1946   2 Sheets-Sheet 1

INVENTOR
WILLIAM H. DuBOIS.
BY
T. J. Plante
ATTORNEY

Aug. 1, 1950 W. H. DU BOIS 2,516,966
FRICTION ELEMENT
Filed Sept. 7, 1946 2 Sheets-Sheet 2

INVENTOR.
WILLIAM H. DU BOIS.
BY
T. J. Plante
ATTORNEY.

Patented Aug. 1, 1950

2,516,966

UNITED STATES PATENT OFFICE 2,516,966

FRICTION ELEMENT

William H. Du Bois, South Bend, Ind., assignor to Bendix Aviation Corporation, South Bend, Ind., a corporation of Delaware Application September 7, 1946, Serial No. 695,483

5 Claims. (Cl. 188—218)

This invention relates to friction elements, and is particularly concerned with the manner of securing friction lining material to the backing member which provides stiffness in a friction element.

The conventional friction element (used in brakes, or the like) utilizes rivets to hold the friction lining material onto the metal disc or shoe which constitutes the supporting or stiffening means. The use of rivets is subject to the disadvantage that they must be removed and replaced whenever new lining is substituted for worn lining. This is particularly time-consuming when the brake is of a type which requires numerous replacements of lining. For example, in airplane brakes the lining may wear down and have to be renewed as many as 10 or 12 times during the life of a brake.

The primary object of the present invention is to provide a friction element in which the lining may be removed and replaced with a minimum expenditure of time and effort.

A further object of the present invention is to provide permanent lining retaining members which do not have to be replaced when the friction element is relined.

Other objects and advantages of the present invention will become apparent during the course of the following description, reference being had therein to the accompanying drawings, in which.

The invention is illustrated as applied to a friction element of a disc brake, although it might also be applied to a friction element of a drum-type brake.

Figure 1:
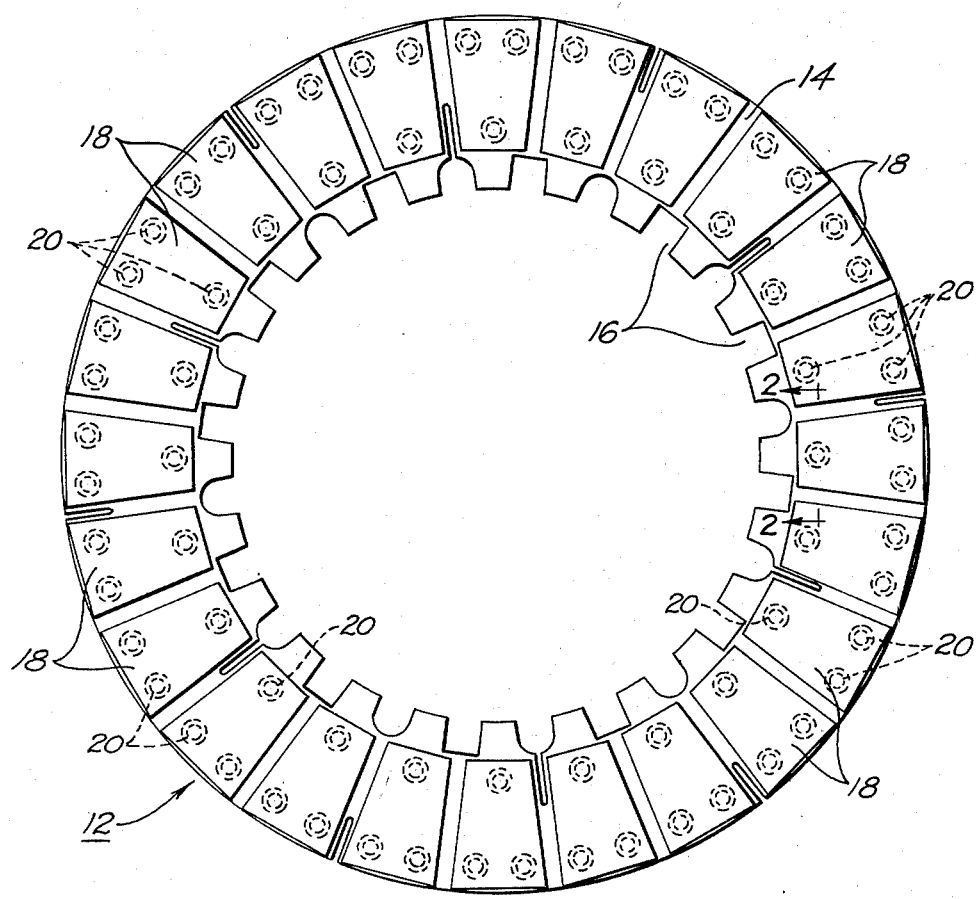
Figure 1 is a side view of a friction element having lining material retained thereon in the manner contemplated by my invention.

Figure 1 shows a side view of a disc member 12 which is adapted to cooperate with other disc members to provide an operating brake assembly. The disc member 12 has a metal backing element 14 provided with a plurality of slots 16, which are adapted to receive suitable anchors or driving keys.

Secured to each side of the disc are a plurality of lining sections 18, it being preferred to utilize a number of spaced sections, or segments, rather than a single annular lining, although the latter is equally adaptable to the present invention. In the illustrated structure, lining sections are applied to both faces of the metal disc 14, although, in some cases, lining will be applied to only one surface of the metal backing member.

In order to simplify the job of replacing the lining sections when worn out, novel retaining means are provided, which are permanently assembled to the metal disc. A plurality of apertures 20 are provided in the metal disc to receive the button, or rivet, assemblies which constitute said retaining means. Preferably the apertures are arranged in groups of three, as shown, each group being associated with the retaining means of one section of lining.

Figure 2:
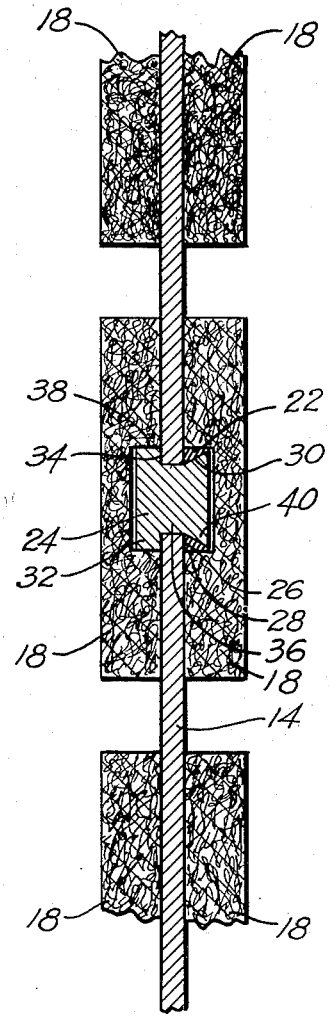
Figure 2 is a section taken on the line 2—2 of Figure 1.

Each button assembly comprises a washer element 22 and a button, or rivet, element 24 (see Figure 2). The washer element 22 has an annular surface 26 lying against one face of the disc 14, an outer cylindrical surface, or periphery, 28, and a tapered, or conical, inner surface 30, which gradually enlarges in diameter as the distance from the disc 14 increases.

The button element 24 comprises a head 32, which has a surface 34 lying against the face of disc 14, and a stem 36, which extends through the respective aperture and washer element. The head 32 has an outer cylindrical surface 38. The stem 36 is originally cylindrical in form, and its right end 40 is upset, after the parts have been assembled, to cause its outer surface to conform to the tapered surface 30 of the washer element, and thereby retain the button and washer elements in place. Although the stem 36 of element 24 may be solid, as shown, it may also be tubular in form, if desired, to facilitate or simplify the upsetting, or riveting, operation.

As stated above, the button assemblies formed by the elements 22 and 24 constitute a permanent part of the disc 14, and are assembled thereto before the lining is applied to the disc. When the lining is applied, the sections are simply pressed over the respective projections provided by the button assemblies.

The lining sections are not clamped between the metal disc and the projections of the button assemblies, and therefore the lining sections, when worn, may be removed without removing the button assemblies, and new lining sections substituted. The torque, or shearing effort, of the coacting discs on the lining sections is taken by the button assemblies, but they do not restrain, to any great extent, lateral, or axial, movement of the lining sections. Such restraint is unnecessary because there is not at any time sufficient axial clearance to permit the lining sections to fall off the disc.

In order to retain the lining sections in place while the brake is being assembled, I may apply a suitable adhesive, such as a cold-setting glue, to the surfaces of the lining sections which engage the metal disc. This serves the purpose of preventing the lining from falling off the disc during assembly, but does not need to retain any particular adhesive strength, once the brake is in operation.

Figure 3:
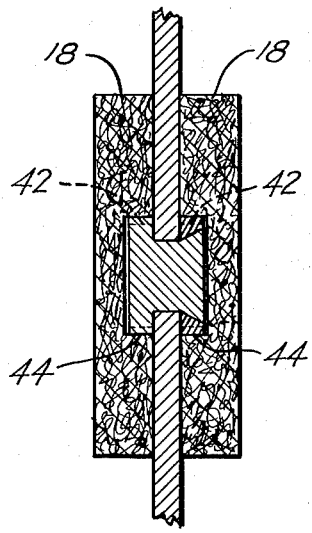
Figure 3 is a sectional view showing a modified version of the invention.
Figure 4:
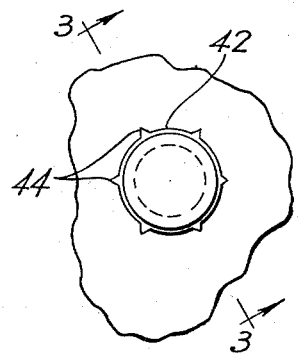
Figure 4 is a side view of the lining retaining member of Figure 3.

Figures 3 and 4 illustrate an arrangement which removes the necessity for applying adhesive between the lining sections and the disc. In this arrangement, the washer element and button element head have knurled or serrated outer surfaces 42, the ridges 44 of which dig into the lining as it is forced into position, to provide a means for retaining the lining sections in position during assembling of the brake.

Regardless whether the embodiment of Figures 1 and 2 or that of Figures 3 and 4 is used, the removal of the lining is a relatively simple operation, because of the light holding force, and because there is no need for removing rivets.

Although particular embodiments of my invention have been described, it will be understood by those skilled in the art that the objects of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. A brake friction element comprising a metal disc having a plurality of apertures therein, said apertures being arranged in groups of three, a washer located at one side of each aperture having an annular surface lying against the surface of the metal disc and having a conical inner diameter gradually enlarging as the distance from the surface of the metal disc increases, a button element located at the other side of each aperture having a cylindrical head lying against the surface of the metal disc and a stem extending through the aperture and upset at the opposite side to fill the conical inner diameter of the respective washer and retain the button element and washer in place, a plurality of readily removable friction lining material sections carried by one side of the metal disc each having three depressions which fit over one group of button element heads, a plurality of readily removable friction lining material sections carried by the other side of the metal disc each having three depressions which fit over one group of washer peripheries, and a cold setting adhesive material between each side of the metal disc and the respective lining material sections for temporarily holding the same to the metal disc during assembly.

2. A brake friction element comprising a metal disc having a plurality of apertures therein, said apertures being arranged in groups of three, a washer located at one side of each aperture having an annular surface lying against the surface of the metal disc and having a conical inner diameter gradually enlarging as the distance from the surface of the metal disc increases, each washer having a cylindrical serrated outer surface, a button element located at the other side of each aperture having a cylindrical head lying against the surface of the metal disc and a stem extending through the aperture and upset at the opposite side to fill the conical inner diameter of the respective washer and retain the button element and washer in place, the outer cylindrical surface of each button element head being serrated, a plurality of readily removable friction lining material sections carried by one side of the metal disc each having three depressions which fit over one group of button element heads, a plurality of readily removable friction lining material sections carried by the other side of the metal disc each having three depressions which fit over one group of washer outer surfaces and a cold setting adhesive for temporarily holding the lining material sections to the metal disc during assembly.

3. A friction element comprising a metal disc having a plurality of apertures therein, a plurality of permanently assembled button-like members extending through said apertures and having portions projecting from both sides of said metal disc, friction lining material carried by each side of the metal disc and having depressions which fit over the projecting portions of the button-like members, and a cold setting adhesive material for temporarily holding the sides of the metal disc and the friction lining material together during assembly.

4. A friction element comprising a metal disc having a plurality of apertures therein, a plurality of permanently assembled button-like members extending through said apertures and having portions projecting from both sides of said metal disc, the outer surfaces of said projecting portions being serrated and readily detachable friction lining material carried by each side of the metal disc and having depressions which fit over the projecting portions of the button-like members and form a uniform and unbroken wearing surface of the lining material.

5. A brake friction element comprising a metal disc having a plurality of apertures therein, a plurality of permanently assembled button-like members extending through said apertures and having portions projecting from both sides of said metal disc, and readily detachable friction lining material carried by each side of the metal disc and having depressions which fit over the projecting portions of the button-like members and form a uniform and unbroken wearing surface of the lining material.

WILLIAM H. DU BOIS.

REFERENCES CITED

The following references are of record in the file of this patent:

UNITED STATES PATENTS

| Number | Name | Date |
|--------|------|------|
| 555,137 | Waters | Feb. 25, 1896 |
| 834,273 | Denney | Oct. 30, 1906 |
| 1,620,043 | Stanley | Mar. 8, 1927 |
| 1,974,561 | Cunningham | Sept. 25, 1934 |
| 2,026,513 | Trombetta | Dec. 31, 1935 |
| 2,114,037 | Spokes | Apr. 12, 1938 |